No. 892,915.
PATENTED JULY 7, 1908.
E. E. TALIAFERRO.
STOP MOTION.
APPLICATION FILED JULY 18, 1907.
2 SHEETS—SHEET 2.
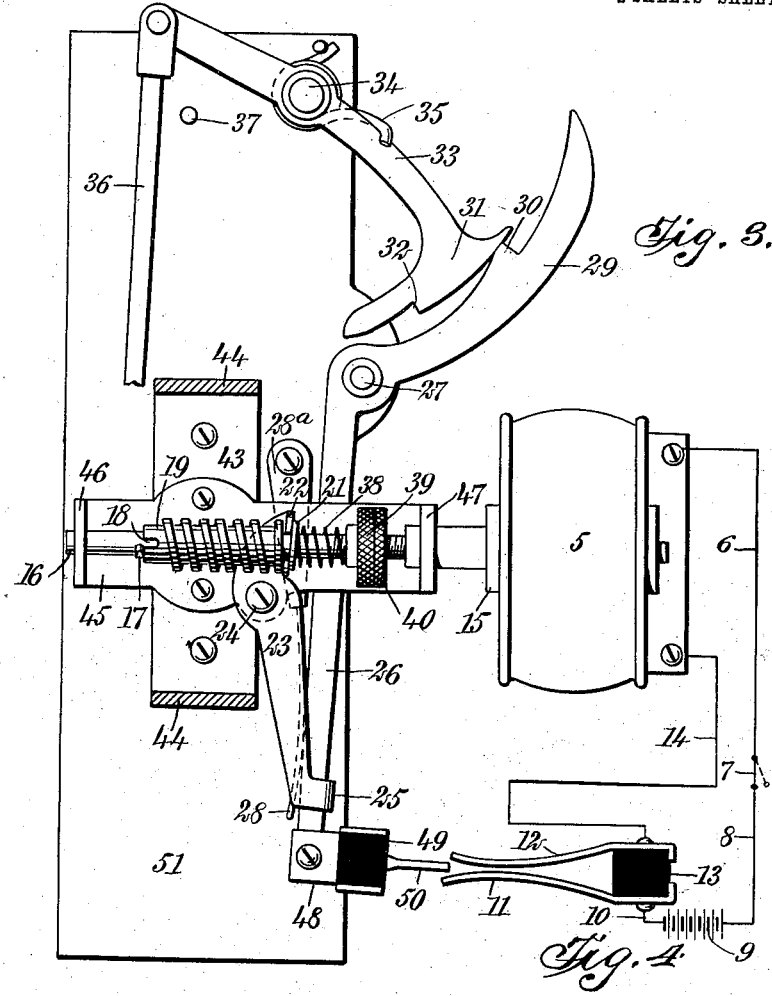
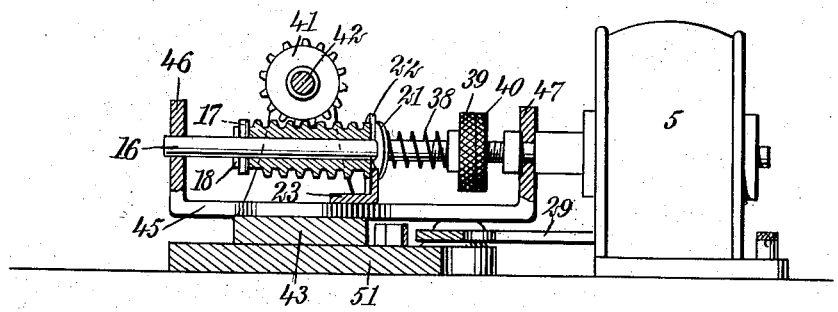
WITNESSES
INVENTOR
Edward E. Taliaferro
BY
ATTORNEYS

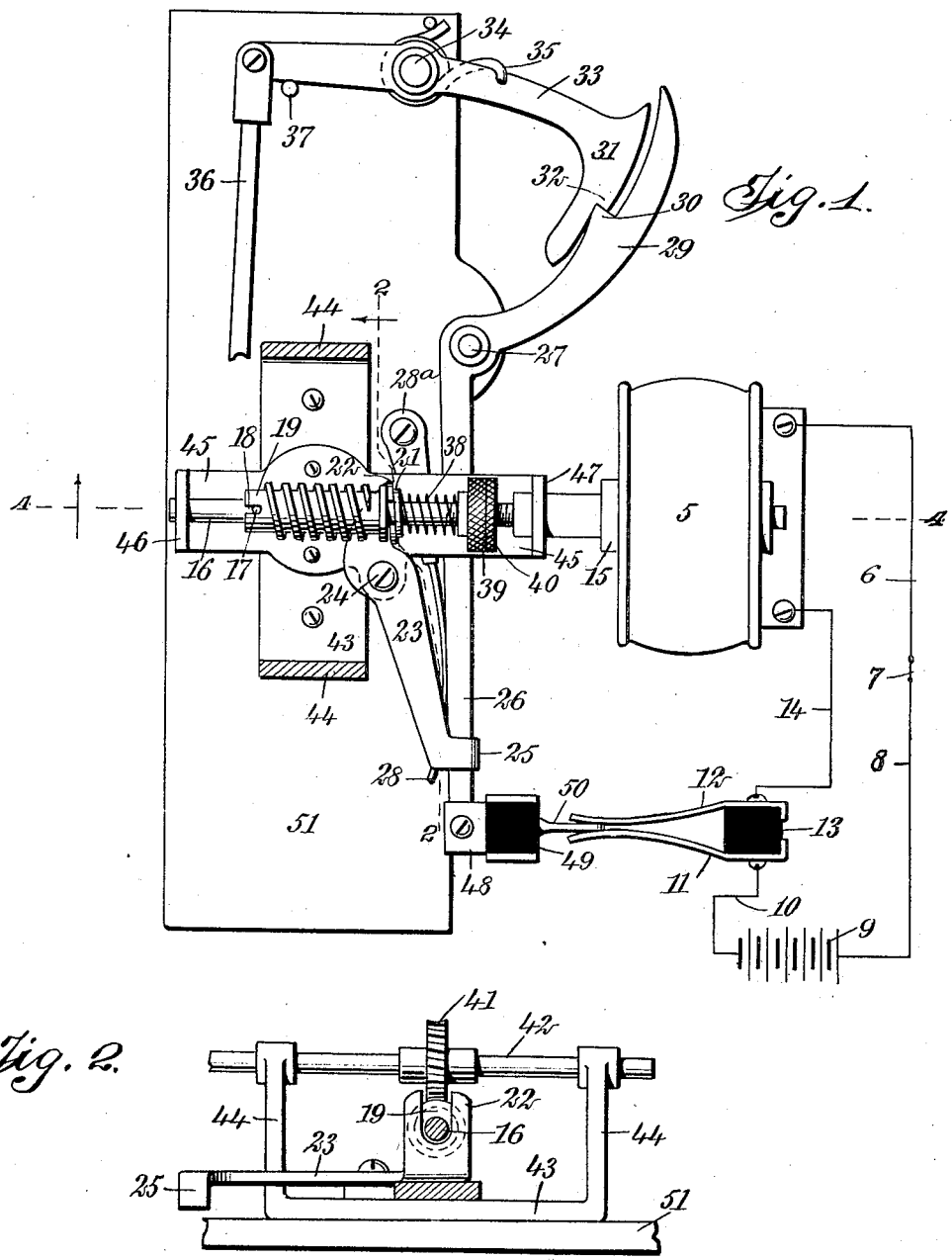

UNITED STATES PATENT OFFICE.

EDWARD ELLETT TALIAFERRO, OF COLORADO SPRINGS, COLORADO, ASSIGNOR OF ONE-SIXTH TO HARRY SPINGLER, OF COLORADO SPRINGS, COLORADO.

STOP-MOTION.

No. 892,915.           Specification of Letters Patent.         Patented July 7, 1908.

Original application filed June 30, 1906, Serial No. 324,180. Divided and this application filed July 18, 1907.
Serial No. 384,338.

*To all whom it may concern:*

Be it known that I, EDWARD ELLETT TALIAFERRO, a citizen of the United States, and a resident of Colorado Springs, in the county of El Paso and State of Colorado, have invented a new and Improved Stop-Motion, of which the following is a full, clear, and exact description.

My invention relates to stop motions, that is to say, devices for disconnecting driven parts from driving members, in such manner as to avoid breakage in case the movement of one or more of the driven parts is obstructed.

My invention further relates to means whereby the power is automatically shut off whenever a driven part is unduly obstructed in its movement.

This application is a division of my pending application Serial No. 324,180, filed June 30, 1906, for a blacking machine.

Reference is to be had to the accompanying drawings forming a part of this specification, in which similar characters of reference indicate corresponding parts in all the figures.

Figure 1 is a side elevation showing an electric circuit including an electric motor, and also showing the electric circuit as closed so that the motor is in action and the driving and driven members engaged in the performance of their duties, the machine being in action; Fig. 2 is a fragmentary section upon the line 2—2 of Fig. 1, looking in the direction of the arrow, and showing a worm and a gear meshing therewith, the worm being adapted to move endwise whenever the driven member is obstructed; Fig. 3 is a view somewhat similar to Fig. 1, but showing the condition of the mechanism after the longitudinal movement of the work has disconnected the driving and driven members and has caused the electric circuit to be opened, thereby stopping the motor; and Fig. 4 is a vertical cross section upon the line 4—4 of Fig. 1, looking in the direction of the arrow, and showing the details of the work and the means for its temporary connection with the shaft passing axially through it.

An electric motor is shown at 5. Connected with it is a wire 6 which leads to a hand switch 7. From the latter a wire 8 leads to a battery 9. From this battery a wire 10 leads to a contact spring 11. This contact spring 11 and another one 12 similar to it, are placed upon opposite sides of a block 13 of insulating material. From the contact spring 12, a wire 14 leads to the motor 5. The motor is provided with a revoluble armature 15, from which extends a shaft 16 used as a driving shaft for many of the movable parts.

A pin 17 projects partially from this shaft and is adapted to enter a slot 18 in a threaded cylindrical worm 19 which fits loosely upon the shaft 16. A washer 21 fits loosely upon the shaft 16. A lever 23 is provided with a Y 22 which extends upwardly and intermediate the washer 21 and the adjacent end of the sleeve 19. The lever 23 is journaled upon a pivot pin 24 and is provided at its lower end with a hook 25, the latter partially encircling the lower end of a lever 26, pivotally mounted upon a pin 27. A leaf spring 28 engages the lower end of the lever 26 and is secured rigidly to a mounting 28$^a$, so that the spring presses constantly against the lever 26 and is adapted to move the latter slightly to the right, according to the view shown in Fig. 3. The lever 26 is provided with a portion 29 having a shoulder 30 integral therewith. A foot 31, having a substantially arcuate form, is provided with a shoulder 32 which is adapted to engage the shoulder 30, the foot 31 being integral with a lever 33 journaled upon a pin 34, and engaged by a spring 35, whereby it is normally retained in a predetermined position, as indicated in Fig. 3. Connected with the upper end of the lever 33 is a rod 36, which is pulled downwardly by hand or otherwise, when the mechanism is to be started in motion.

A stop pin 37 is engaged by the lever whenever the rod 36 is drawn downwardly to its limit, in which event the shoulder 32 locks against the shoulder 30 as soon as the pull upon the rod 36 is released. When the shoulder 32 slips over the shoulder 30, the lower end of the lever 26 swings to the right and remains for the time being in the position thus assumed (see Fig. 1).

Encircling the driving shaft 16 is a spiral spring 38 serving as a main spring. Normally, (when the machine is running) the spring 38 sustains the entire load of the driven parts. When, however, the load becomes excessive, or whenever the movement of any driven part is obstructed unduly, the spring yields and allows the worm to move endwise to the right, according to Figs. 3 and 4. Milled nuts 39, 40 are threaded internally and mounted upon the shaft, which is threaded externally for the purpose of receiving them. These nuts are adjustable; the nut 39 serves as an adjusting nut and the nut 40 as a lock nut. By aid of these nuts the tension of the spring 38 may be regulated within certain limits at will.

A worm gear 41 meshes with the worm above described, and is mounted rigidly upon a revoluble driven shaft 42. A bracket 43 is provided at its ends with uprights 44 integral therewith, these parts being used for supporting the driven shaft 42, as will be understood from Fig. 2.

A bracket 45 is provided with upright portions 46, 47 integral therewith, these upright portions being used for supporting the driving shaft 16. Mounted upon the lower end of the lever 26 is a head 48 carrying a block 49 of insulating material. Mounted upon this block and projecting therefrom is a blade 50 of metal. This blade is adapted to slide in between the contact springs 11, 12 so as to connect them together. A board 51 is conveniently employed for supporting many of the parts above described, as will be understood from Fig. 1.

The operation of my device is as follows: The switch 7 being closed, the operator pulls the rod 36 downward, which causes the shoulder 32 to pass the shoulder 30. The tension of the leaf spring 28 causes the lever 26 to move a little to the right so that the shoulder 30 locks with the shoulder 32, as indicated in Fig. 1. This movement causes the blade 50 to enter between the contact spings 11, 12, thereby completing the following circuit: Battery 9, wire 8, switch 7, wire 6, motor 5, wire 14, contact spring 12, blade 50, contact spring 11, wire 10, back to battery 9. This energizes the motor 5 and causes its armature 15 and the driving shaft 16 to rotate. The tension of the main spring 38 being proportioned according to the load to be driven and adjusted by means of the nut 39 and nut lock 40, the tension of the spring 38 remains constant and the worm, while rotating under a normal load, maintains its position constantly. During this time the pin 17 rests against the bottom of the slot 18. Suppose, now, that in consequence of the load becoming excessive or of some driven part being obstructed in its movement, the main spring 38 is unable to resist the excessive pressure upon it, and that the spring yields in consequence; the worm 19, moving to the right, as elsewhere explained, the result is that the worm is thereby disconnected from the pin 17 and the driven mechanism is thus disconnected from the driving mechanism, the shaft 16 now turning idly. The movement of the worm to the right causes the lever 23 to rock and this lever in turn causes a rocking movement to take place in the lever 26, whereby the switch knife 50 is withdrawn from the switch and the electric circuit broken so as to stop the motor.

As a concrete instance, I may suggest that in a particular machine the driven mechanism will not run properly unless the main spring 38 be under a tension represented by 100 pounds pressure. In this instance the nut 39 is adjusted so as to confer a pressure of 100 pounds upon the spring and the nut 39 is then locked by aid of the lock nut 40. If a margin be desired over this pressure, it can be increased say to 150 pounds. In this instance, the clogging of any of the driven gearing or the obstruction of rotation of the shaft 42 or any parts driven by it, will cause the worm to "throw;" that is, to disconnect itself from the shaft 16 and to shut off the power.

The principle underlying the longitudinal axial movement of the worm 19 is simply this: The worm gear 41 being unable to turn with proper freedom and the motor 5 continuing to rotate the shaft 16, the worm must move axially because of the inclination of the threads upon the worm. In other words, the worm gear 41 must rotate or else the worm must both rotate and move in the general longitudinal direction of its own axis.

While in the present application I show the shaft 16 and the worm as coupled together by aid of a pin 17 and slot 18, constituting together a type of clutch, it will be noted that any other clutch mechanism may be employed as an equivalent. It will also be noted that I do not limit myself by showing the various levers 33, 26, 23, for obviously the worm gear and main spring can be made to perform their respective offices through agencies of other kinds than the levers mentioned.

While for convenience I show as a source of power an electric current driving a motor and controlled by a switch, it will be understood that any other source of power may be employed.

Having thus described my invention, I claim as new and desire to secure by Letters Patent:

1. The combination of a revoluble shaft, a plurality of stationary bearings for supporting the same, a substantially cylindrical worm encircling said shaft and loose relatively thereto, said worm being disposed intermediate said bearings, clutch mechanism for connecting and disconnecting said worm and said shaft, a spring disposed adjacent to said worm for actuating said clutch mechanism, said spring encircling said shaft and turning therewith, said spring being always under tension, a worm gear meshing with said worm and driven thereby, means for turning said shaft so that normally said worm causes said worm gear to turn, and means controllable by longitudinal movements of said worm along said shaft for the purpose of shutting off the source of power.

2. The combination of a source of power, a revoluble shaft turned thereby, bearings for supporting said shaft, a worm loosely encircling said shaft and adapted to move axially along the same, said worm being disposed intermediate said bearings, clutch mechanism for preventing relative rotation between said shaft and said worm, a spring encircling said shaft and adapted to hold said worm in such position that said clutch mechanism normally prevents relative rotation between said worm and said shaft, said spring being revoluble with said shaft, means controllable at will for governing the tension of said spring relatively to said worm, a revoluble gear member meshing with said worm and turned thereby, said worm being adapted to move endwise and increase the tension of said spring whenever movement of said revoluble gear member is obstructed, and means controllable by the longitudinal axial movement of said worm for disconnecting said source of power from said revoluble member.

3. The combination of a source of power, a revoluble shaft turned by said source of power, bearings for supporting said revoluble shaft, a worm loosely encircling said shaft and adapted to move axially along the same, said worm being disposed intermediate said bearings, clutch mechanism for preventing relative rotation between said shaft and said worm, a spring encircling said shaft and adapted to hold said worm in such position that said clutch mechanism normally prevents relative rotation between said worm and said shaft, said spring being revoluble with said shaft, means controllable at will for governing the tension of said spring relatively to said worm, a revoluble gear meshing with said worm and turned thereby, said worm being adapted to move endwise and increase the tension of said spring whenever movement of said revoluble gear member is obstructed, and means controllable by the longitudinal axial movement of said worm for disconnecting said source of power from said revoluble member, said means including a lever provided with a portion disposed intermediate said spring and said worm.

4. The combination of a driven member, a driving member temporarily connected therewith and adapted to be disconnected therefrom when said driven member is obstructed in its movement, means controllable by the release of said driving member from said driven member for disconnecting the source of power therefrom, and mechanism controllable partly by said driven member and partly by said driving member for disconnecting said driving member from said driven member.

In testimony whereof I have signed my name to this specification in the presence of two subscribing witnesses.

EDWARD ELLETT TALIAFERRO.

Witnesses:
  A. D. AITKEN,
  JOS. F. SCHLOTTER.